United States Patent
Badhani et al.

(10) Patent No.: US 9,457,518 B2
(45) Date of Patent: Oct. 4, 2016

(54) METHOD AND APPARATUS FOR CONTROLLING PRINTABILITY OF A 3-DIMENSIONAL MODEL

(71) Applicant: Adobe Systems Incorporated, San Jose, CA (US)

(72) Inventors: Hemant Badhani, Delhi (IN); Ashish Chopra, Delhi (IN); Naveen Prakash Goel, Noida (IN); Ardhendu Sekhar Panda, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 352 days.

(21) Appl. No.: 14/175,611

(22) Filed: Feb. 7, 2014

(65) Prior Publication Data

US 2015/0224715 A1    Aug. 13, 2015

(51) Int. Cl.
*B29C 67/00*    (2006.01)
*G05B 15/02*    (2006.01)
*B33Y 50/02*    (2015.01)
*G06F 17/50*    (2006.01)

(52) U.S. Cl.
CPC .......... *B29C 67/0088* (2013.01); *G05B 15/02* (2013.01); *B33Y 50/02* (2014.12); *G06F 17/50* (2013.01); *G06F 2217/12* (2013.01)

(58) Field of Classification Search
None
See application file for complete search history.

(56) References Cited

U.S. PATENT DOCUMENTS

| | | | |
|---|---|---|---|
| 6,956,568 B2 | 10/2005 | Maekawa et al. | |
| 2006/0095152 A1 | 5/2006 | Loughran | |
| 2007/0013724 A1* | 1/2007 | Swift | G06F 17/5004 345/660 |
| 2010/0031351 A1 | 2/2010 | Jung et al. | |
| 2011/0242607 A1 | 10/2011 | Shenoy et al. | |
| 2012/0051584 A1 | 3/2012 | Bonner et al. | |
| 2012/0092724 A1 | 4/2012 | Pettis | |
| 2013/0120369 A1 | 5/2013 | Miller et al. | |
| 2014/0058959 A1* | 2/2014 | Isbjornssund | G06F 21/10 705/310 |
| 2015/0220291 A1* | 8/2015 | Tapley | G06F 3/1296 358/1.15 |

FOREIGN PATENT DOCUMENTS

| | | |
|---|---|---|
| WO | WO 2012/146943 A2 | 11/2012 |
| WO | WO 2013/036942 A1 | 3/2013 |

OTHER PUBLICATIONS

Ki-Ryong Kwon, et al., "The Watermarking for 3D CAD Drawing Using Line, ARC, 3DFACE Components; Dept. of Electronics, Computer, and Telecommunication Engineering", Pukyong National University, ICME, 2006, pp. 1361-1364.
Oliver Benedens, "Geometry-Based Watermarking of 3D Models", Fraunhofer Institute for Computer Graphics; 10 pages. 1999.
Xiaoyang Mao, et al., "Watermarking 3D Geometric Models Through Triangle Subdivision", Department of Computer and Media Engineering, Yamanashi University, Japan; Proceedings of SPIE, vol. 4314, 2001, pp. 253-260.

* cited by examiner

*Primary Examiner* — Eric C Wai
(74) *Attorney, Agent, or Firm* — Keller Jolley Preece

(57) ABSTRACT

A computer implemented method and apparatus for controlling printability of a 3D model. The method comprises modifying a 3D model according to a plurality of transformation details, wherein the transformation details modify the 3D model so as to break one or more printability rules, and wherein modifying does not alter an appearance of the 3D model.

20 Claims, 5 Drawing Sheets

METHOD AND APPARATUS FOR CONTROLLING PRINTABILITY OF A 3-DIMENSIONAL MODEL

BACKGROUND OF THE INVENTION

1. Field of the Invention

Embodiments of the present invention generally relate to 3-dimensional (3D) printing and, more particularly, to a method and apparatus for controlling printability of a 3D model.

2. Description of the Related Art

With the increasing popularity of 3D printers, either for home printing use or via a remote service, there is a greater availability of artistic 3D models for printing. The creators of 3D models showcase their creations on websites where prospective customers can view and purchase one or more 3D models. Use of the actual 3D model file to create a "What You See Is What You Get" (WYSIWYG) display on a website provides the prospective customers with a best viewing experience to preview the model. However, providing the actual 3D model file to enable the display also provides users the opportunity to download the file and print the 3D model without paying the creator.

Therefore, there is a need for a method and apparatus for controlling printability of a 3D model.

SUMMARY OF THE INVENTION

A method for controlling printability of a 3D model is described. The method modifies a 3D model according to a plurality of transformation details. The modifications do not alter the appearance of the 3D model, but renders the 3D model unprintable. The method then publishes the modified unprintable 3D model; and upon fulfillment of one or more requirements that allow printing of the 3D model, restores the printability of the 3D model.

In another embodiment, an apparatus for controlling printability of a 3D model is described. The apparatus includes a modification module for modifying a 3D model according to a plurality of transformation details, and a restoration module for restoring the printability of the 3D model upon fulfillment of one or more requirements that allow printing of the 3D model.

In yet another embodiment, a computer readable medium for controlling printability of a 3D model is described. The computer readable medium causes a processor to perform a method that modifies a 3D model according to a plurality of transformation details. The modifications do not alter the appearance of the 3D model, but renders the 3D model unprintable. The method then publishes the modified unprintable 3D model; and upon fulfillment of one or more requirements that allow printing of the 3D model, provides for restoration of the printability of the 3D model.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
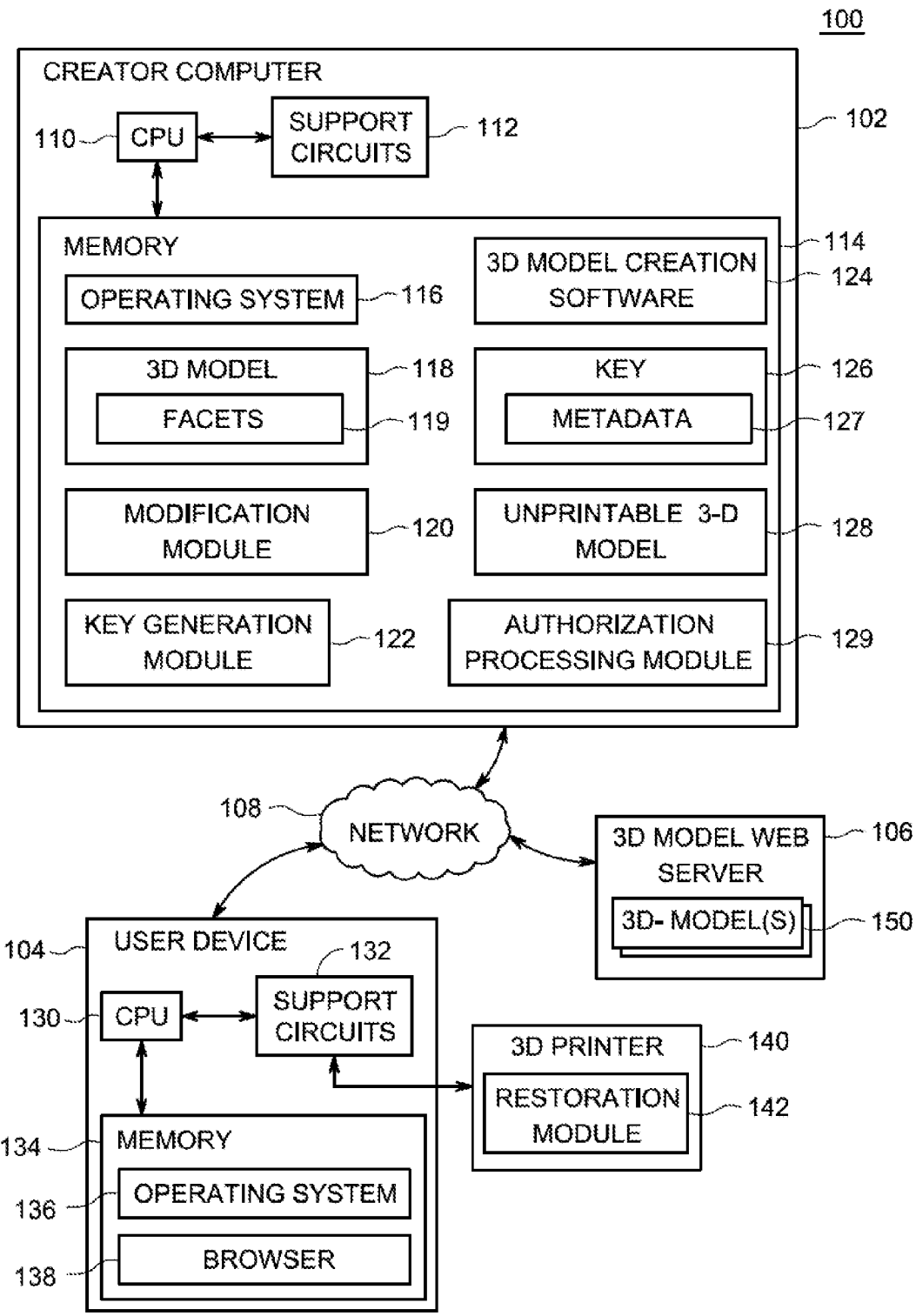
FIG. 1 is a block diagram of a system for controlling printability of a 3D model, according to one or more embodiments.

While the method and apparatus is described herein by way of example for several embodiments and illustrative drawings, those skilled in the art will recognize that the method and apparatus for controlling printability of a 3D model is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for controlling printability of a 3D model defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As previously explained, providing the actual 3D model file to enable the display also provides users the opportunity to download the file and print the 3D model without paying the creator. This denies compensation to the creator of the 3D model.

Thus, and in accordance with an embodiment of the present invention, techniques are provided herein to allow for controlling printability of a 3D model. The embodiments modify a 3D model such that the 3D model cannot be printed, but when viewed on a website, looks almost identical to the original 3D model. That is, the change in appearance due to the modification is imperceptible. In order for a 3D model to be printed, specific rules must be met. Examples of rules of printability include, but are not limited to: all edges must be shared by exactly two facets, the exterior of the 3D model must be watertight, and the 3D model must have correctly oriented faces. If any of the printability rules are broken, an error occurs and the 3D model does not print. Embodiments of the invention modify the 3D model such that one or more of the printability rules are broken so as to disable printing. The modifications are reversible and controlled by a key. When authorized, the key is provided and the modifications are reversed, thereby bringing the 3D model back to its original form that may then be 3D printed.

Before providing a 3D model for publication, a creator of the 3D model may identify one or more facets of the 3D model that should not be modified because modification of said facets would alter the appearance of the 3D model. One or more types of transformations are selected to be used to make the 3D model unprintable. The types of transformations used may be selected at random or selected based on the complexity of the 3D model. The facets that are to be modified are also selected. The key is generated that identifies the type of transformations and to which facets the transformations are application.

After key generation, a non-printable 3D model is generated based on facet and transformation information in the key. Each facet that is identified as receiving a transformation is modified. Information regarding the transformations, for example, a number of facets, an extent of each transformation, and a hash value for the non-printable 3D model is stored in metadata and the metadata is stored in the key. The 3D model is then ready for publishing.

When the 3D model is purchased the key is provided to transform the non-printable 3D model into a printable form. The key is verified to ensure that the correct key is being used to modify the non-printable model. A hash value of the non-printable model is compared to the hash value in the metadata in the key. Matching hash values indicate that the key is the correct key to transform the non-printable 3D model into a printable 3D mode. Upon verification of the key, the 3D model is transformed. The key is accessed to identify what transformations were performed on which facets and the transformations are reversed. The 3D model may then be sent to a 3D printer for printing.

Advantageously, the embodiments described herein can be employed to allow creators of 3D models to showcase 3D models to prospective customers while controlling the printability of the 3D model. By withholding the key that is used to render the 3D model printable until after payment is received, the creator's monetary interests are protected. Presenting an actual 3D model file to a prospective customer is more beneficial than displaying images or a less detailed browser rendered model. Viewing the actual 3D model allows compositing of a 3D model complete with custom-lighting and camera angles; true to the WYSIWYG paradigm. In such cases, the compositing experience may be what turns a prospective customer into a paying customer.

As used herein, the term 3D model, depending on the context where used, includes one or both of the electronic file that defines a 3D model, as well as a print of that file into a physical 3D model. Publishing of a 3D model includes facilitation of publication by providing or making available the 3D model to a prospective customer, such as by providing the 3D model to a website or to any location where a prospective customer may access and view the 3D model. Furthermore, restoring the printability of a 3D model includes providing a key that allows restoration of the 3D model.

Various embodiments of a method and apparatus for controlling printability of a 3D model are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for controlling printability of a 3D model, according to one or more embodiments. The system 100 includes a creator computer 102, a user device 104, and a 3D model web server 106, communicatively coupled to one another via a network 108. The creator computer 102 is a computing device, for example a desktop computer, laptop, tablet computer, and the like. The creator computer 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a 3D model 118, a modification module 120, a key generation module 122, 3D model creation software 124, a key 126, an unprintable 3D model 128, and an authorization processing module 129. The key 126 includes metadata 127. In some embodiments, the 3D model creation software 124 resides on a remote device (not shown) where the 3D model 118 is created and sent to the creator computer 102 for processing. In such embodiments, the creator computer 102 could be embodied as a service such that a creator may submit their 3D model to be transformed into an unprintable 3D model 128. In any event, the 3D model 118 includes a plurality of facets 119 that make up the 3D model 118. In some embodiments, the 3D model 118 is defined using a standard tessellation language (STL) file. The operating system 116 may include various commercially known operating systems.

The user device 104 is a computing device, for example a desktop computer, laptop, tablet computer, and the like. The user device 104 includes a Central Processing Unit (CPU) 130, support circuits 132, and a memory 134. In some embodiments, the user device 104 is connected to a 3D printer 140. In such embodiments, the 3D printer 140 may include a restoration module 142. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, and a browser 138. The operating system 136 may include various commercially known operating systems. The 3D model web server 106 includes a plurality of 3D models 150 that may be viewed by potential customers. The 3D models 150 may be viewed on the user device 104 via the browser 138; however the 3D models 150 cannot be printed as a result of having been rendered unprintable by the modification module 120. In some embodiments, the 3D model web server 106 includes the 3D printer 140 such that a potential customer may view, purchase, and print one or more 3D models 150 via the 3D model web server 106. In other embodiments, 3D printing using the 3D printer 140 may be provided as a service to and used in combination with the 3D model web server 106.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

Before providing a 3D model 118 for publication, a creator of the 3D model 118 may identify one or more facets 119 of the 3D model 118 that should not be modified because modification of said facets 119 would perceptibly alter the appearance of the 3D model 118. The identified one or more facets 119 that should not be modified are stored in metadata for the 3D model 118. The 3D model 118 is then accessed by the key generation module 122. The key generation module 122 determines which facets 119 of the 3D model 118 are to be modified, how the facets 119 are to be modified, and to what magnitude the facets 119 are to be modified. The key generation module 122 parses the 3D model 118 in order to retrieve this facet modification information. Based on the facet data, one or more facets 119 may be designated as "not modifiable". A designation of "not modifiable" may be because modification of such one or more facets 119 would perceptibly alter the appearance of the 3D model 118. The key generation module 122 then selects what modifications are to be applied to which facets 119. The goal when modifying the facets is to break printability rules for the 3D model 118. When all printability rules are met, the 3D model 118 is printable. However, when one or more printability rules are broken, the 3D model 118 is rendered unprintable. Printability rules may include, but are not limited to: the 3D model 118 must have all edges of the 3D model 118 shared by exactly two facets 119, the 3D model 118 must be watertight, the 3D model 118 must have correctly oriented facets 119, and the 3D model 118 must not be self-intersecting.

The key generation module 122 may use one or more types of modifications in order to break one or more printability rules. For example, modifying a tilt angle of one or more facets 119 introduces minute holes in the 3D model, thereby breaking the "watertight" rule of printability. Resizing one or more facets 119 also introduces minute holes in the 3D model 118. Adding one or more facets 119 to the 3D model 118 such that the added facets 119 share an edge with a facet 119 in the 3D model 118 breaks the rule that each edge must be shared by exactly two facets 119. Intersecting two facets 119 by moving a vertex of a first facet 119 inside another facet 119 introduces self-intersection in the 3D model. Reversing a normal of a facet 119 modifies the orientation of the facet 119 thereby breaking the printability rule requiring correctly oriented facets 119.

The key generation module 122 may select one or more types of modifications at random or according to pre-defined settings. Alternatively, the key generation module 122 may select one or more types of modifications based on a size of the 3D model 118, a number of facets of the 3D model 118, a variance of facet sizes of the 3D model 118, creator parameters that control appearance of the 3D model, and the like. The key generation module 122 also selects one or more facets 119 to modify and identifies the magnitude of the modification. For example, the key generation module 122 may select a tilt modification to every $25^{th}$ facet 119, where every $25^{th}$ facet is tilted at a tilt angle that may be determined based on an area of the facet 119 in order to create a very small tilt-angle that is sufficient to introduce minute imperfections to the 3D model 118. The key generation module 122 stores the modifications in a key 126. The key 126 is a file that is associated with the 3D model 118 and includes metadata 127. If, for example, the key generation module 122 resizes one or more facets, a transformation tolerance defines the extent by which the facet is resized.

The modification module 120 performs the modifications to the 3D model 118 that were stored in the key 126. The modification module 120 also stores additional metadata 127 (i.e., information related to the modifications) with the key 126. The metadata 127 may include the tilt angle if a tilt transformation was performed, a transformation tolerance if a facet resize or facet addition was performed, a facet count of 3D model 118, a facet count of the unprintable 3D-model 128, and a hash value for the unprintable 3D-model 128. The modified 3D model 118 is stored as unprintable 3D model 128. The key 126 is provided for later use after purchased of the 3D model 118 to reverse the modifications to the unprintable 3D model 128 in order to return it to the original and printable 3D model 118.

The unprintable 3D model 128 is published on the 3D model web server 106 as 3D model 150. The 3D model 150 may include requirements for restoring printability. For example, 3D model 150 may have payment terms that are required for printability. The 3D model 150 may be free with the entry of a coupon code. The 3D model 150 may be free to print without any requirements for restoring printability. A user of the user device 104 may download the 3D model 150 via the browser 138. The authorization processing module 129 processes the fulfillment of the requirements for restoring printability for the 3D model 150. Upon successful fulfillment of the requirements, the authorization processing module 129 provides the key 126 to restore printability. In some embodiments, the authorization processing module 129 provides the key 126 to the user device 104, such that the 3D model 150 may be rendered printable on the user device 104 and printed on the 3D printer 140. In some embodiments, the authorization processing module 129 provides the key 126 to the 3D model web server 106, such that the 3D model 150 may be rendered printable on the 3D model web server 106 and, as a service, printed by the 3D model web server 106.

In either case, the restoration module 142 verifies that the key 126 corresponds to the 3D model 150. The restoration module 142 compares the hash value of the unprintable 3D model 128 that is in the metadata 127 of the key 126 to a hash value of the 3D model 150. If the hash values are equal, the key 126 is determined to be the correct key 126 to restore printability to the 3D model 150. The restoration module 142 identifies the types of transformations, facets that were modified, and the magnitude of the transformations (i.e., tilt angle and transformation tolerance, if applicable) from the key 126. The restoration module 142 modifies the 3D model 150. The restoration module 143 inverses the modifications that were performed to the make the 3D model 150 unprintable. The resultant 3D model may then be printed on the 3D printer 140.

Figure 2:
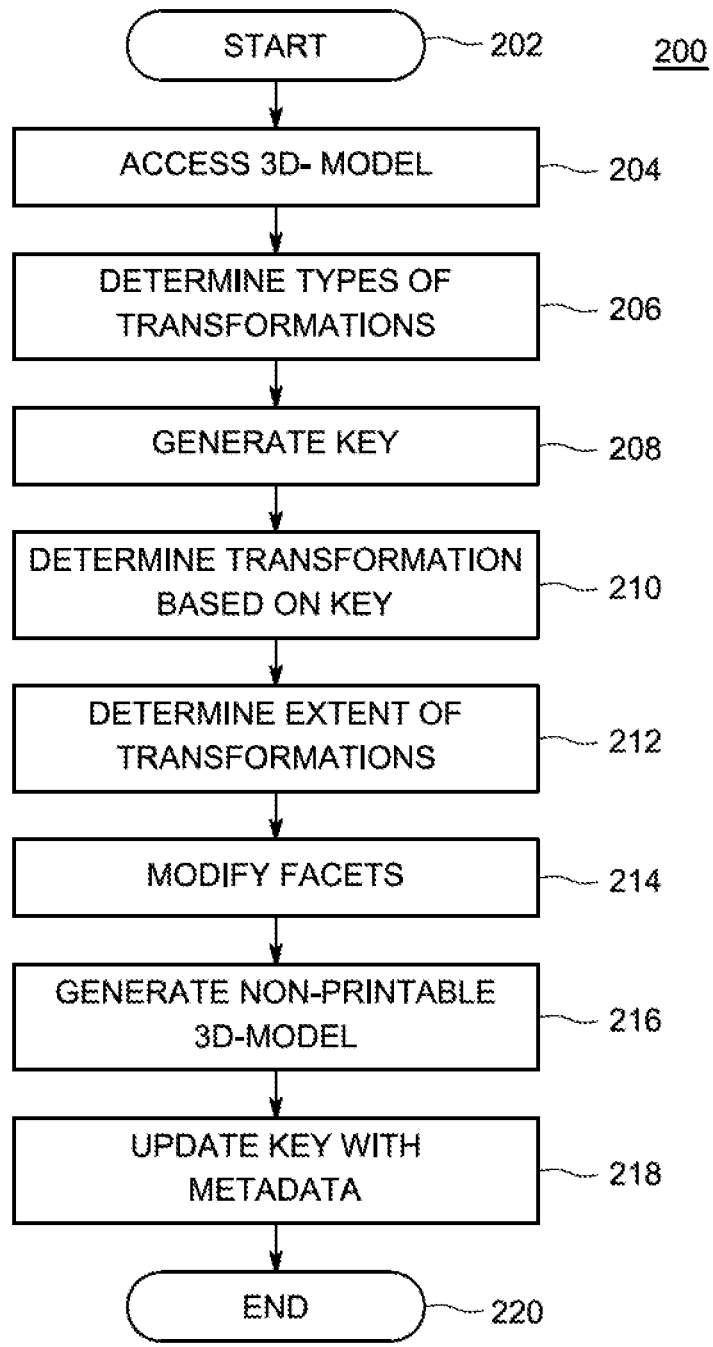
FIG. 2 is a flow diagram of a method for modifying a 3D model to render the 3D model unprintable, as performed by the key generation module and the modification module of FIG. 1, according to one or more embodiments.

FIG. 2 is a flow diagram of a method 200 for modifying a 3D model to render the 3D model unprintable, as performed by the key generation module 122 and the modification module 120 of FIG. 1, according to one or more embodiments. The method 200 modifies one or more facets of a 3D model such that at least one printability rule is broken, thereby rendering the 3D model unprintable. The method 200 starts at step 202 and proceeds to step 204.

At step 204, the method 200 accesses the 3D model. In some embodiments, the 3D model is defined by a standard tessellation language file format, such as the .STL file format native to stereolithography CAD software and other 3D model creation software. The 3D model is made up of a plurality of facets. Each facet is typically a triangle that is identified by three vertices and a unit normal vector pointing outward. For example, a facet may be defined in an STL file as follows:

---
solid object
    facet normal 0.0-1.0 0.0
        outer loop
            vertex 0.0 0.0 0.0
            vertex 0.0 0.0 1.0
            vertex 1.0 0.0 0.0
        endloop
    endfacet
    . . .
    . . .
endsolid
---

For a 3D model to be 3D printable, the 3D model must adhere to a plurality of printability rules. For example, the 3D model:
- must have all of its edges shared by exactly two facets. An edge is any point on the surface of the 3D model where two facets meet.
- must be watertight. In other words, there can be no holes on the surface of the 3D model.
- must have correctly oriented facets.
- must not be self-intersecting.

Failing to comply with one or more of these printability rules causes the 3D printing of the 3D model to fail. In order to render the 3D model unprintable, the method 200 modifies the 3D model to break one or more of these rules. The method 200 proceeds to step 206.

At step 206, the method 200 determines the types of transformations made to one or more facets of the 3D model, and to which facets each type of transformation was made. The method 200 parses the 3D model and generates facet data. For example, the method 200 may calculate a number of facets, determine a size of the model, determine a variance of facet sizes, and possibly assess parameters that a creator of the 3D model may have specified to control the appearance of the 3D model. For example, the creator may have identified one or more facets that are critical to the appearance of the 3D model and, declared the one or more facets as unmodifiable. The method 200 may determine the types of transformations that are to be made to the 3D model based on the generated facet data. However, the method 200 may select the types of transformations randomly.

Transformations are changes to a 3D model that break a printability rule and render the 3D model unprintable. The types of transformations that may be made include, but are not limited to:
- tilting a facet,
- resizing a facet, adding a facet,
- intersecting two facets, and
- reversing the normal of a facet.

A person of ordinary skill in the art may determine other transformations. Tilting a facet involves moving one vertex of a facet to a new coordinate, so as to tilt the facet. The tilt transformation introduces a minute hole to the surface of the 3D model. Very small tilt-angles are sufficient to introduce minute imperfections in the 3D model which make the 3D model non-watertight without perceptibly affecting the appearance of the 3D model.

In some embodiments, the tilt-angle, which defines the extent by which the facet is tilted, may be proportional to the area of the facet that is modified using the tilt transformation, where the proportionality constant is predefined, for example, $1°/0.1$ mm$^2$. The tilt-angle may be calculated as follows:

$$\text{tilt-angle} = \text{proportionality constant} \div \text{area of the facet}$$

Resizing a facet scales the area of the facet by increasing or decreasing all edges of a facet by a small factor. Minute scaling ratios make the 3D model non-watertight without perceptibly affecting the appearance of the 3D model. A transformation tolerance defines the extent by which a facet is resized. The extent is expressed as a percentage of the area of the facet. The percentage of the extent may be predefined to be, for example, 1% of the area of the facet.

Adding a facet adds a facet such that the added facet shares one of its edges with a facet of the 3D model. As previously stated, a 3D model must have all of its edges shared by exactly two facets. By adding a facet that shares one of its edges with a facet of the 3D model, the resultant edge is shared by three facets, thereby breaking a printability rule without affecting the appearance of the 3D model. The new facets are placed after the original facets. With a new vertex very close to an existing edge, the model is made non-manifold. The transformation tolerance defines how far the new vertex of the added facet is from an existing edge in the 3D model. The transformation tolerance is expressed as a percentage of a length of the edge and defines a displacement along a perpendicular-bisector of the existing edge. The percentage may be predefined to be, for example, 1% of the length of the edge.

Intersecting facets moves a vertex of a first facet to a new coordinate that is located inside of a second facet, thereby introducing self-intersection into the 3D model, without a perceptible change in the appearance. A small displacement of a facet is sufficient to make the model non-manifold.

Reversing a normal of a facet involves multiplying the normal of the facet with a negative identity matrix ($-I_{3\times 3}$) to reverse its direction. Reversing the normal alters the orientation of the facet, but does not affect a facet's coordinates and has no effect on the appearance of the 3D model.

The method 200 determines which transformation to perform on which facets. In some embodiments, the extent (i.e., magnitude) of a transformation is determined when the types of transformations are identified. In some embodiments, the extent of the transformation is determined just before the 3D model is modified. Any algorithm may be used to select the transformation. For example, there are four transformations discussed above. One or more may be selected at random. The method 200 may use any algorithm when selecting facets. The algorithm generates a constrained sequence of natural numbers capped to the total number of faces and transformation available to the present method 200. The algorithm must be repeatable, given identical initialization states (i.e., return a same sequence of numbers, given a same starting point). In one embodiment, the method 200 may select which facets to use by implementing a pseudorandom number generator (PRNG) algorithm, which can be started from an arbitrary starting state (seed) and always produces the same sequence thereafter when initialized with that state. The transformation is applied to the starting point and applied to the facets corresponding to the sequence produced by the PRNG.

For example, the method 200 may use a 12-byte (3 word) key to identify the selected facets, where the first word is a PRNG seed, the second word is a tolerance-value and a third word is count-of-random-numbers-to-generate. For example, the C++ snippet below indicates how a key may be read and values given to the method 200:

```
keyFH.open("sampleStl.UniqK", fstream::in|fstream::binary);
keyFH.read(reinterpret_cast<char*>(&seed), sizeof(int));
keyFH.read(reinterpret_cast<char*>(&toleranceVal), sizeof(float));
keyFH.read(reinterpret_cast<char*>(&randNumsToGenerate), sizeof(int));
```

In another embodiment, the method 200 uses a Fibonacci Series algorithm. A binary sequence of words, where the sequence is of a length equal to the number of types of transformations is created. Each word corresponds to one of the transformations. For example, five transformations are described above. An additional transformation may be included that identifies facets that are designated as non-modifiable. For each word in the binary sequence, the first half-word may indicate a first facet that is affected by the transformation and the second half-word may identify the span of the progression. Consider the binary sequence:

(00020003 00000000 00000000 00000000 00050006 00000000)

Each word corresponds to a transformation. For example, the word 00020003 corresponds to the first type of transformation, namely tilt transformation. The word 00050006 corresponds to the fifth type of transformation, namely reverse normal. The remaining words are 00000000, which means that the corresponding types of transformations are not used to modify the 3D model.

Using the Fibonacci Series, (0, 1, 1, 2, 3, 5, 8, 13, 21, 34, 55, 89, 144, 233, 377, 610, 987, . . . ) each word in the binary sequence above identifies the starting facet for the transformation and the subsequent facets that are to be transformed. In the example, Ser. No. 00/020,003, for the tilt transformation, the first half-word, 0002, identifies the starting facet. 0002 identifies the second number in the Fibonacci Series, which is 1. Hence, the first facet (i.e., facet 1) is modified by the tilt-angle. The second half-word, 0003, identifies every third number in the Fibonacci Series. Hence the next facets to be modified using the tilt transformation are the $3^{rd}$ facet, $13^{th}$, $55^{th}$, $233^{rd}$, Similarly, the facets modified by the reverse normal transformation, per the word 00050006. The half-word 0005 refers to the fifth number in the Fibonacci series, which is the number 3 and 0006 refers to the facet that corresponds to every $6^{th}$ number in the Fibonacci series, specifically, $55^{th}$, $987^{th}$, $17771^{st}$, . . . .

The method 200 proceeds to step 208, where the method 200 generates a key that includes the types of transformations and the facets to which they are applied. If the extent of the transformation has been determined, the extent of each type of transformation is included in the key. In one embodiment, the key may simply include the binary sequence described above. The method 200 proceeds to step 210, where the method 200 determines the transformations as identified in the key.

The method 200 proceeds to step 212, where the method 200 determines the extent of the transformation. In some embodiments, where the extent of each transformation is not included in the key (i.e., where the extent was not determined at step 206), the extent is determined here at step 212. The method 200 proceeds to step 214, where the method 200 modifies the facets according to key as described in further detail with respect to FIG. 3 below. The method 200 proceeds to step 216, where the method 200 generates an unprintable 3D model that includes the transformed facets.

The method 200 proceeds to step 218, where the method 200 generates metadata for the unprintable 3D model and adds the metadata to the key. The method 200 stores the tilt-angle and transformation tolerance, if applicable in the metadata. The method 200 also stores, in the metadata, the number of facets in the printable 3D model and the number of facets in the modified 3D model. Lastly, the method 200 generates and stores, in the metadata, a hash value for the modified 3D model, using any hash algorithm, such as MD5, SHA1, and the like. The method 200 proceeds to step 220 and ends.

Figure 3:
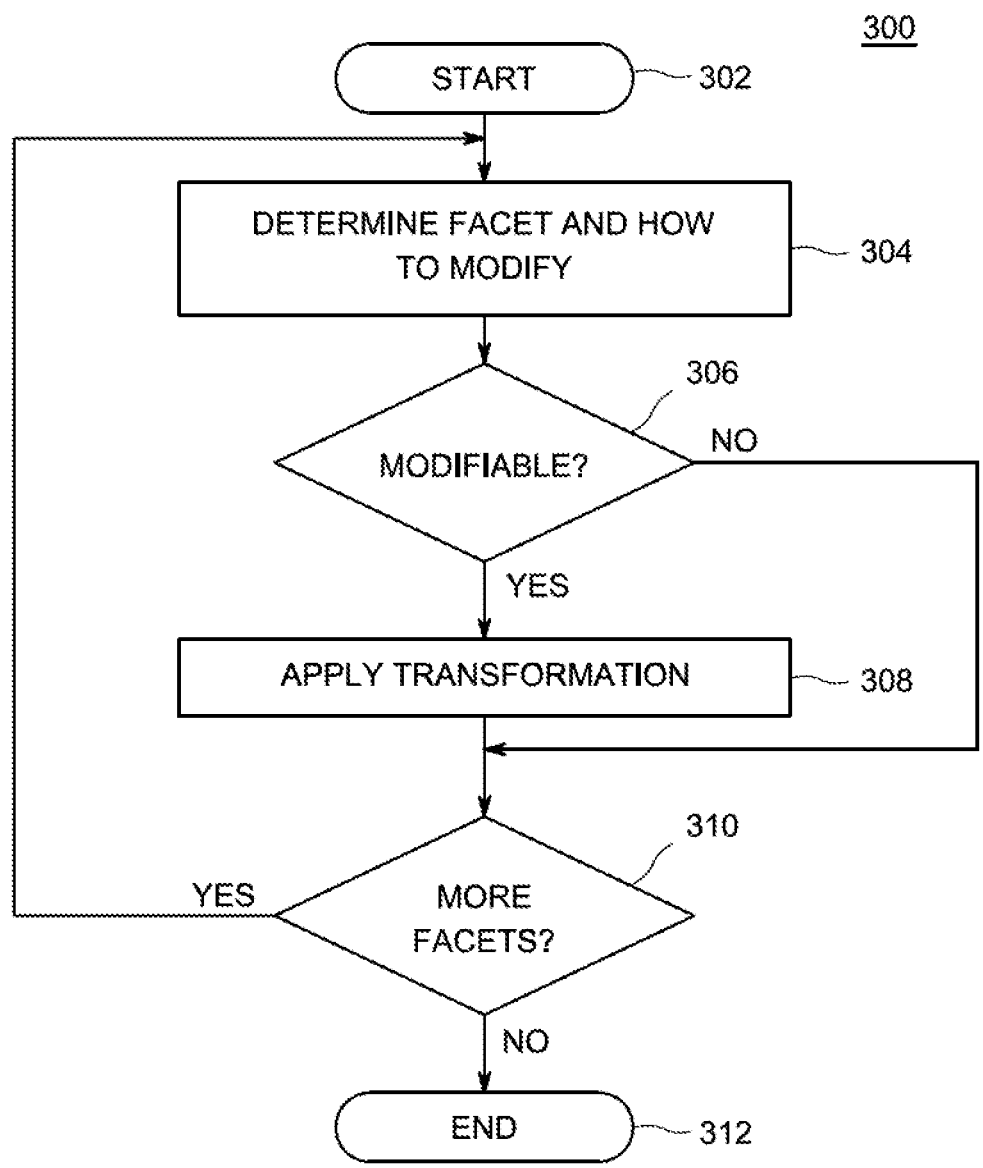
FIG. 3 depicts a flow diagram of a method for modifying facets of a 3D model according to the key, as performed by the modification module of FIG. 1, according to one or more embodiments.

FIG. 3 depicts a flow diagram of a method 300 for modifying facets of a 3D model according to the key, as performed by the modification module 120 of FIG. 1, according to one or more embodiments. The method 300 modifies the facets identified in the key according to the corresponding type of transformation. The method 300 starts at step 302 and proceeds to step 304.

At step 304, the method 300 determines the type of transformation and the facet to modify from the key. The method 300 proceeds to step 306, where the method 300 determines if the facet to be transformed is designated as a non-modifiable facet. The method 300 determines a facet is non-modifiable if it is identified in the key as being of the transformation type "non-modifiable". If the method 300 determines that the facet is non-modifiable, the method 300 proceeds to step 310.

However, if at step 306, the method 300 is not designated as a non-modifiable facet, the method 300 proceeds to step 308. At step 308, the method 300 applies the transformation. For example, the transformation may be to invert the normal of a facet. Before the transformation, the definition of the facet is defined as follows:

```
facet normal −5.365680E−01 5.987670E−01 5.946200E−01
    outer loop
        vertex 6.964593E+01 −3.735248E+01 1.004595E+02
        vertex 6.962593E+01 −3.707248E+01 1.001595E+02
        vertex 6.970593E+01 −3.767248E+01 1.001995E+02
    endloop
endfacet
```

After transforming the facet by inversing the normal, the facet is defined as:

```
facet normal 5.365680E−01 −5.987670E−01 −5.946200E−01
    outer loop
        vertex 6.962593E+01 −3.707248E+01 1.001595E+02
        vertex 6.964593E+01 −3.735248E+01 1.004595E+02
        vertex 6.970593E+01 −3.767248E+01 1.001995E+02
    endloop
endfacet
```

In the present example, the signs of "normal" coefficients are reversed, as well as the order of the first and second vertex. The method 300 proceeds to step 310.

At step 310, the method 300 determines whether there are more facets that need to be modified. If the method 300 determines that there are more facets that need to be modified, the method 300 proceeds to step 304 and iterates until at step 310, no more facets need to be modified. The method 300 proceeds to step 312 and ends.

Figure 4:
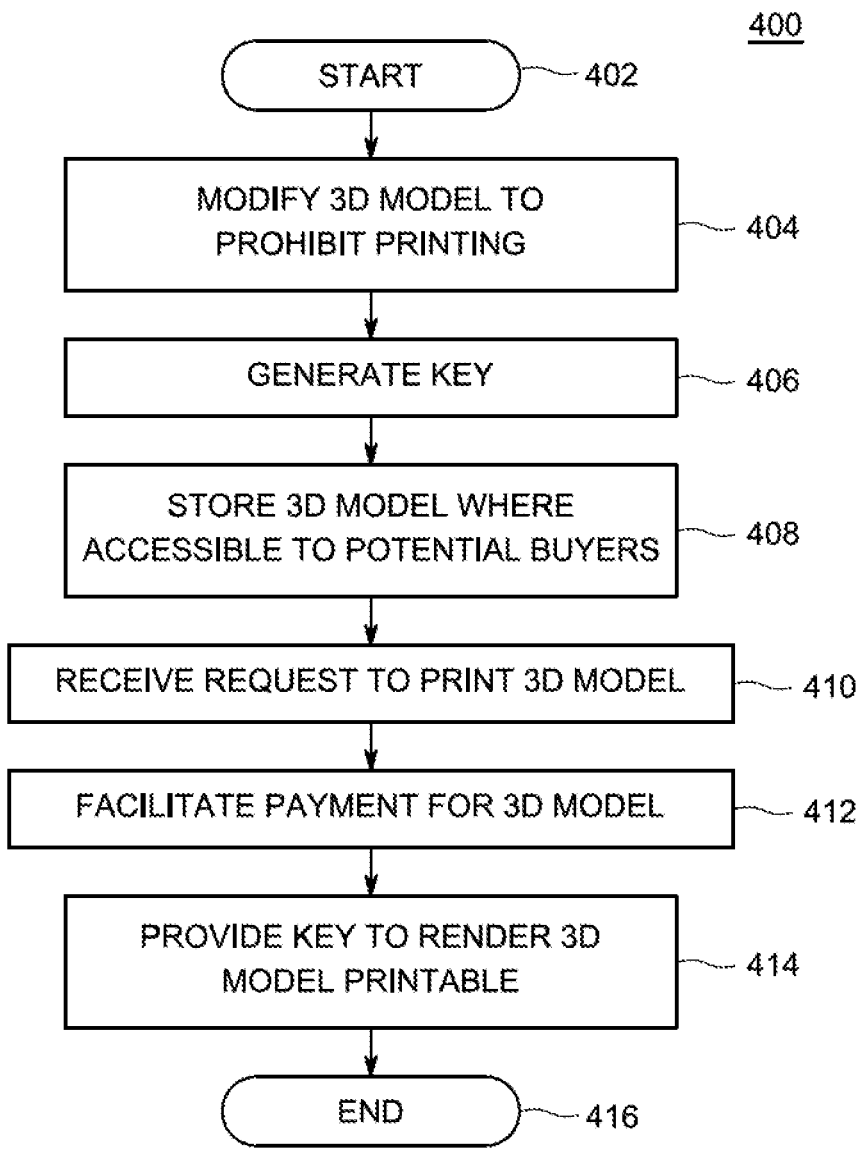
FIG. 4 depicts a flow diagram of a method for transacting an authorization to print a 3D model as performed by the modification module, key generation module and the authorization processing module of FIG. 1, according to one or more embodiments.

FIG. 4 depicts a flow diagram of a method 400 for transacting an authorization to print a 3D model as performed by the modification module 120, key generation module 122 and the authorization processing module 129 of FIG. 1, according to one or more embodiments. The method 400 modifies a 3D model to render it unprintable and upon fulfillment of printing requirements, provide a key that is used to render the 3D model printable. The method 400 starts at step 402 and proceeds to step 404.

At step 404, the method 400 modifies a 3D model to prohibit printing. The method 400 determines types of transformations to perform on the 3D model and modifies facets of the 3D model using the method 300 above. The method 400 proceeds to step 406, where the method 400 generates a key as in detail with respect to step 208 of FIG. 2 above.

The method 400 proceeds to step 408, where the method 400 stores the 3D model where it is accessible for viewing by potential buyers. The method 400 may display it on a website with other 3D models available to download and printing. The method 400 proceeds to step 410, where the method 400 receives a request to print a 3D model. The method 400 determines the requirements to authorize printing of the 3D model. Authorization may be in the form of payment, input of a coupon code, and the like.

The method 400 proceeds to step 412 where the method 400 facilitates authorization for the printing of the 3D model. The method 400 may process a payment for printing the 3D model, or process any authorization required for printing. Upon successful authorization, the method 400 proceeds to step 414, where the method 400 provides the key needed to render the 3D model printable. The method 400 may provide the key to a web server that is hosting the website where the 3D model is displayed. The web server may provide printing as a service to a buyer. The method 400 may provide the key to the buyer who may then send the key and 3D model to a 3D printer. The key may be used to render the 3D model printable as described in further detail with respect to FIG. 5 below. The method 400 proceeds to step 416 and ends.

Figure 5:
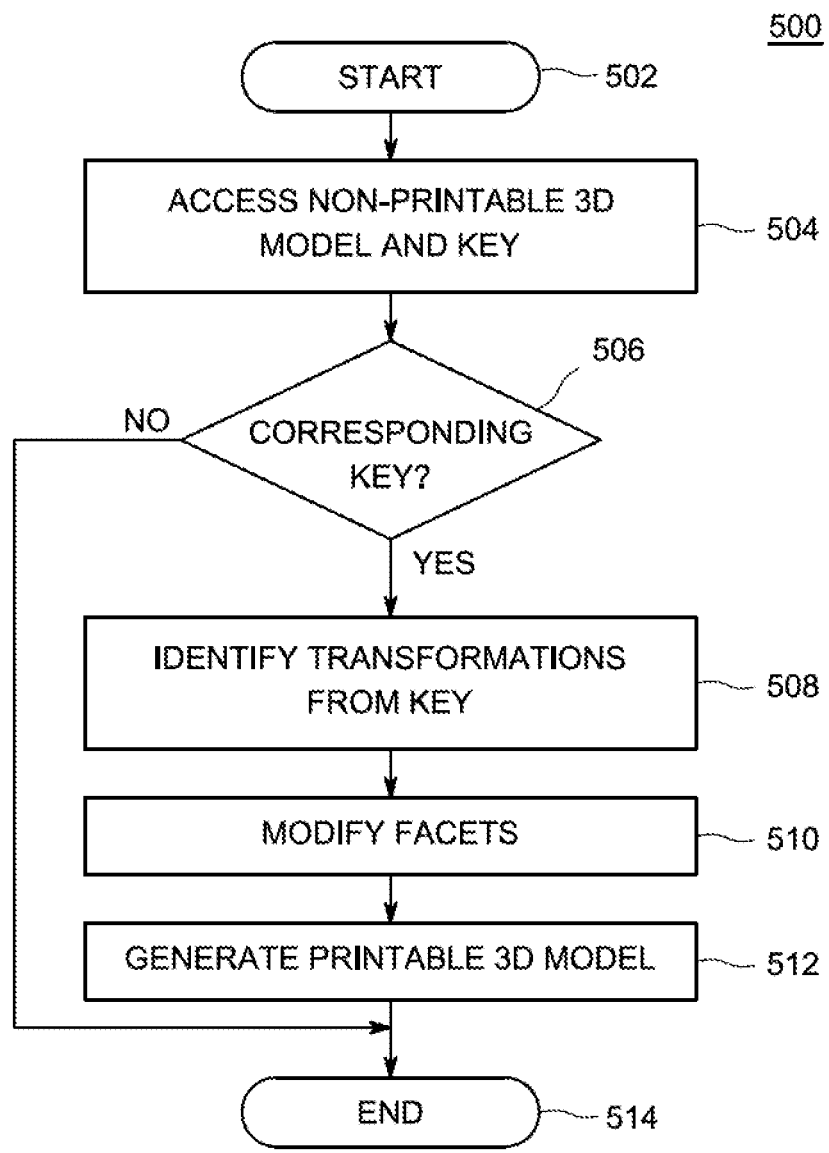
FIG. 5 depicts a flow diagram of a method for modifying an unprintable 3D model to restore printability, as performed by the restoration module of FIG. 1, according to one or more embodiments.

FIG. 5 depicts a flow diagram of a method 500 for modifying an unprintable 3D model to restore printability, as performed by the restoration module 142 of FIG. 1, according to one or more embodiments. Upon receipt of payment for the 3D model, the method 500 inverses the transformations made to the 3D model that made it unprintable. The method 500 starts at step 502 and proceeds to step 504.

At step 504, the method 500 accesses the unprintable 3D model and a key that includes transformation detail regarding how the 3D model was rendered unprintable. The method 500 proceeds to step 506, where the method 500 determines whether the key corresponds to the unprintable 3D model. Each key is unique to a 3D model. In order to ensure that the correct key is used to transform the unprintable 3D model, the method 500 calculates a hash value for the unprintable model. The method 500 then compares the hash value with a hash value of the unprintable 3D model that is included in the key. If the hash values do not match, the method 500 provides an error message and the method 500 proceeds to step 514, where the method 500 ends. However, if the hash values match, then the method 500 determines that the key corresponds to the unprintable 3D model and the method 500 proceeds to step 508. At step 508, the method 500 identifies, from the key, transformations performed on the original 3D model, the facets on which the transformations were performed and the extent of the transformations.

The method 500 proceeds to step 510, where the method 500 modifies the facets similarly as performed by method 400 above. However, instead of applying the transformation as done in step 408, the method 500 performs an inverse of the transformation on each facet that was modified.

The method 500 proceeds to step 512, where the method 500 generates a printable 3D model based on the inverse transformations performed in step 510 above. The method 500 proceeds to step 514, where the method 500 ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing a printable 3D model;
generating, by at least one processor, an unprintable 3D model from the printable 3D model by modifying at least one facet of the printable 3D model according to a plurality of transformation details in a manner that breaks one or more printability rules, wherein modifying the at least one facet of the printable 3D model imperceptibly changes an appearance of the 3D model.

2. The method of claim 1, further comprising:
publishing the unprintable 3D model; and
restoring printability of the unprintable 3D model upon fulfillment of one or more requirements that allow printing of the unprintable 3D model by undoing one or more more modifications made to the at least one facet.

3. The method of claim 2, wherein restoring printability of the unprintable 3D model comprises providing a key upon fulfillment of the one or more requirements.

4. The method of claim 3, wherein the key comprises information for reversing one or more transformations made to the at least one facet.

5. The method of claim 1, wherein generating an unprintable 3D model further comprises:
determining one or more transformations to apply to the at least one facet; and
generating a key that identifies the determined one or more transformations.

6. The method of claim 1, wherein modifying at least one facet of the 3D model comprises at least one of modifying a tilt angle of the at least one facet of the 3D model, resizing the at least one facet of the 3D model, adding the at least one facet to the 3D model, intersecting two or more facets of the 3D model, or reversing a normal of the at least one facet of the 3D model.

7. The method of claim 1, wherein the 3D model is defined in a Standard Tessellation Language (.STL) file.

8. The method of claim 1, further comprising:
designating the at least one facet of the printable 3D model to be modifiable; and
designating at least one other facet of the printable 3D model to be not modifiable.

9. A non-transitory computer readable medium for storing computer instructions that, when executed by at least one processor causes a computing device to perform a method for controlling printability of a 3D model comprising:
generating an unprintable 3D model from the 3D model by performing a transformation on at least one facet of the 3D model;
generating a key that identifies the transformation performed on the at least one facet of the 3D model used to render the 3D model unprintable;
publishing the unprintable 3D model;
receiving a request to print the published unprintable 3D model; and
providing the key that identifies the transformation performed on the at least one facet of the 3D model to facilitate reversing of the transformation to render the unprintable 3D model printable.

10. The computer readable medium of claim 9, wherein performing a transformation on the at least one facet of the 3D model comprises at least one of modifying a tilt angle of at least one facet of the 3D model, resizing at least one facet of the 3D model, adding at least one facet to the 3D model, intersecting two or more facets of the 3D model, or reversing a normal of at least one facet of the 3D model.

11. The computer readable medium of claim 10, wherein one or more facets of the 3D model are designated as not modifiable, and wherein one or more facets of the 3D model are designated as modifiable.

12. The computer readable medium of claim 9, wherein the 3D model is defined in a Standard Tessellation Language (.STL) file.

13. A system comprising:
   at least one processor; and
   at least one non-transitory computer readable storage medium storing instructions thereon that, when executed by the at least one processor, cause the system to:
      access a 3D model;
      generate an unprintable 3D model from the 3D model by performing a transformation on at least one facet of the printable 3D model according to a plurality of transformation details that breaks one or more printability rules, and wherein performing the transformation on the at least one facet of the 3D model imperceptibly changes an appearance of the 3D model.

14. The system of claim 13, wherein the instructions, when executed by the at least one processor, further cause the system to:
   generate a key that identifies the transformation.

15. The system of claim 13, wherein the instructions, when executed by the at least one processor, further cause the system to restore a printability of the unprintable 3D model upon fulfillment of one or more requirements that allow printing of the 3D model by performing an inverse of the transformation on the at least one facet.

16. The system of claim 15, wherein the instructions, when executed by the at least one processor, further cause the system to restore the printability of the modified unprintable 3D model by providing a key upon fulfillment of the one or more requirements.

17. The system of claim 16, wherein the key comprises information for reversing the transformation on the at least one facet.

18. The system of claim 13, wherein performing a transformation on the at least one facet comprises at least one of modifying a tilt angle of at least one facet of the 3D model, resizing at least one facet of the 3D model, adding at least one facet to the 3D model, intersecting two or more facets of the 3D model, or reversing a normal of at least one facet of the 3D model.

19. The system of claim 18, wherein one or more facets of the 3D model are designated as not modifiable, and wherein one or more facets of the 3D model are designated as modifiable.

20. The system of claim 13, wherein the 3D model is defined in a Standard Tessellation Language (.STL) file.

\* \* \* \* \*